United States Patent
Wang

[19]

[11] Patent Number: 6,089,265
[45] Date of Patent: Jul. 18, 2000

[54] MULTI-SWIVEL CONNECTOR FOR CONNECTING A FLUID OPERATED TOOL A SOURCE OF FLUID

[75] Inventor: Yong Wang, Ossining, N.Y.

[73] Assignee: Unex Corporation, Mahwah, N.J.

[21] Appl. No.: 09/187,838

[22] Filed: Nov. 6, 1998

[51] Int. Cl.[7] .................................................. F16L 27/00
[52] U.S. Cl. ...................................... 137/580; 285/147.1
[58] Field of Search ......................... 137/580; 285/147.1; 901/16

[56] References Cited

U.S. PATENT DOCUMENTS

| | | | |
|---|---|---|---|
| 4,362,324 | 12/1982 | Kelly | 285/147.1 |
| 4,823,835 | 4/1989 | Chu | 137/580 |
| 5,269,345 | 12/1993 | Hiestand et al. | 137/580 |
| 5,311,796 | 5/1994 | Junkers | 137/580 |

*Primary Examiner*—A. Michael Chambers
*Attorney, Agent, or Firm*—Michael J. Striker

[57] ABSTRACT

A multi-swivel connector for connecting a fluid-operated tool to a fluid source has a post having an axis, a swivel unit having an axis extending perpendicular to the axis of the post, at least one fluid line entering the post at one end of the post and exiting on the a swivel unit at another end of the post, a fitting unit connected to the a swivel unit and having at least one second fluid line which extends from the at least one fluid line through the fitting outwardly to be connected with a hose or the like extending from the fluid source, so that when the fluid enters the a fitting unit it is fed to the one end of the post to operate the fluid-operated tool, and the a fitting unit are turnable around the axis of the post and tiltable around the axis of the a swivel unit.

11 Claims, 5 Drawing Sheets

MULTI-SWIVEL CONNECTOR FOR CONNECTING A FLUID OPERATED TOOL A SOURCE OF FLUID

BACKGROUND OF THE INVENTION

The present invention relates to a multi-swivel connector for connecting a fluid operated tool to a source of fluid, for example to hoses extending from a fluid source.

Swivel connectors of the above mentioned general type are known in the art. One of such connectors is disclosed in my U.S. Pat. No. 5,311,796. There are applications where the swivel post turns around the cylinder housing. As the diameter of the cylinder housing can be rather large, turning the friction created by the seals. As the usual 360-degree rotation might however not be enough to avoid hose kinking, a problem that can delay finishing the job by up to 30 minutes, a dual directional swivel of small dimensions is desirable. As the tool needs to be kept small especially for pocket and other limited clearance applications, it is desirable to design a hose swivel connector so that it is small in its contour, yet allows the hose to be moved not just 360° around one axis, but also at least 180° around a perpendicular axis. This in turn permits the operator's get the hoses out of the way of any obstacle, even in the most confined areas.

SUMMARY OF THE INVENTION

Accordingly, it is an object of present invention to provide a multi-swivel connector for connecting a fluid-operated tool to a fluid source, which avoids the disadvantages of the prior art.

In keeping with these objects and with others which will become apparent hereinafter, one feature of present invention resides, briefly stated in a multi-swivel connector for fluid-operated tools of the above mentioned type, which has a post having an axis; swivel means having an axis extending perpendicular to said axis of said post; at least one fluid line entering said post at one end of said post and exiting on said swivel means at another end of said post; fitting means connected to said swivel means and having at least one second fluid line which extends from said at least one fluid line through said fitting outwardly to be connected with a hose or the like extending from the fluid source, so that when the fluid enters said fitting means it is fed to said one end of said post to operate the fluid-operated tool, and said fitting means are turnable around said axis of said post and tiltable around said axis of said swivel means.

When the multi-swivel connector is designed in accordance with the present invention, it avoids the disadvantages of the prior art and provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
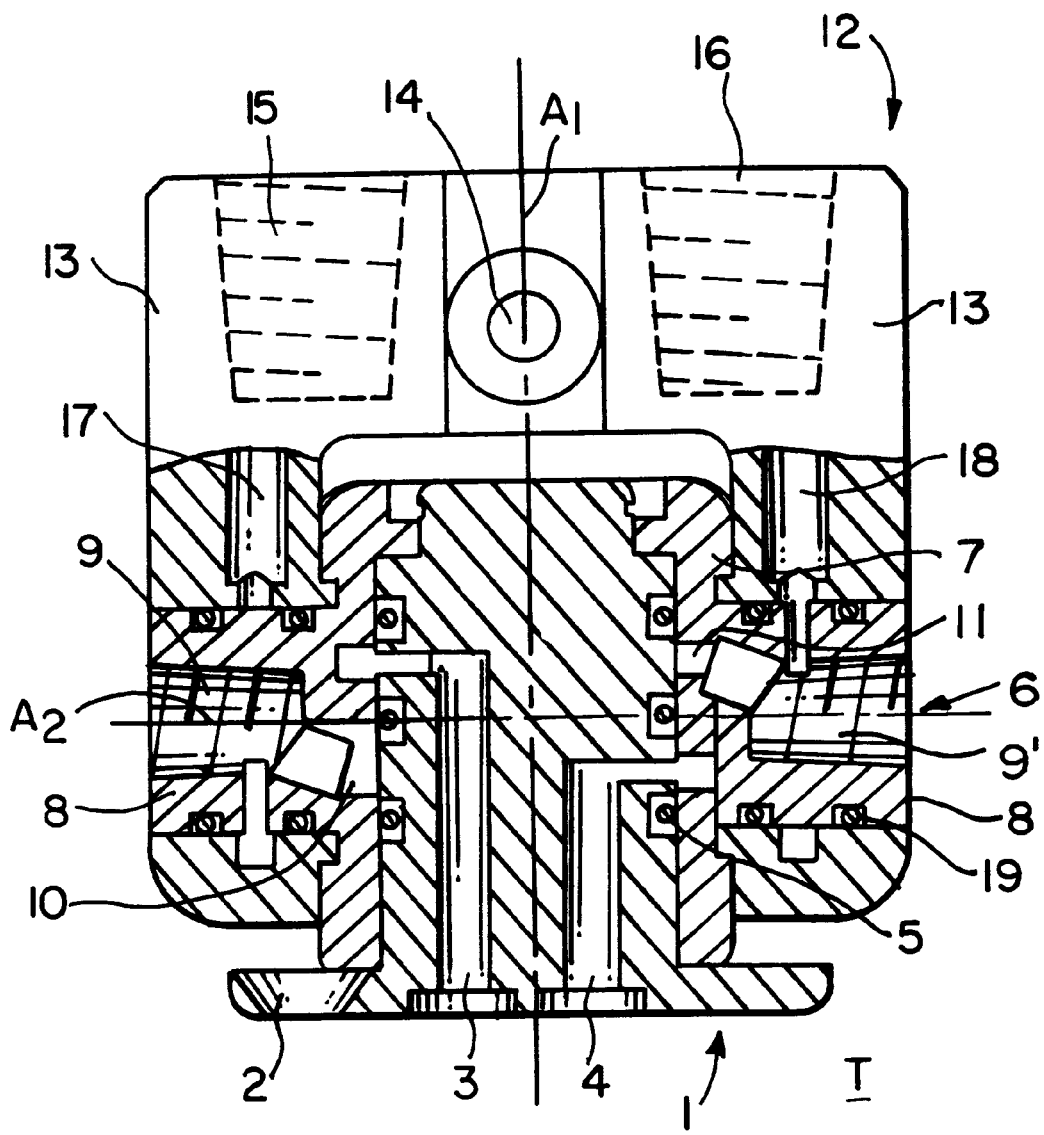
FIG. 1 is a cross-section a multi-swivel connector for connecting a fluid-operated tool with a source of fluid in accordance with one embodiment of the present invention.
Figure 2:
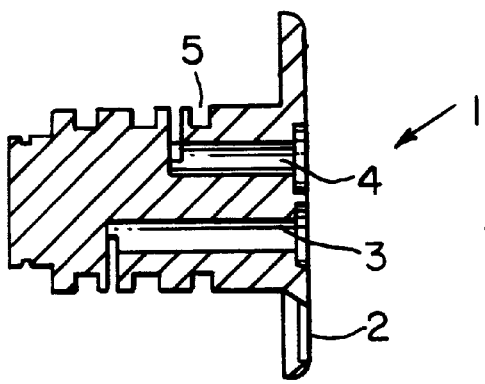
FIGS. 2, 3 and 4 are a section, a side view, and an end view of a post of the inventive multi-swivel connector of FIG. 1.
Figure 3:
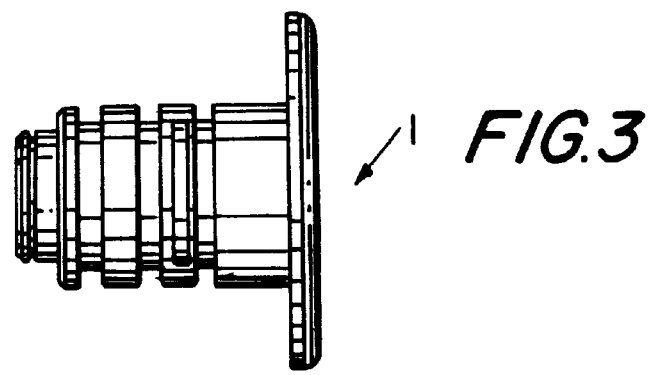
Figure 4:
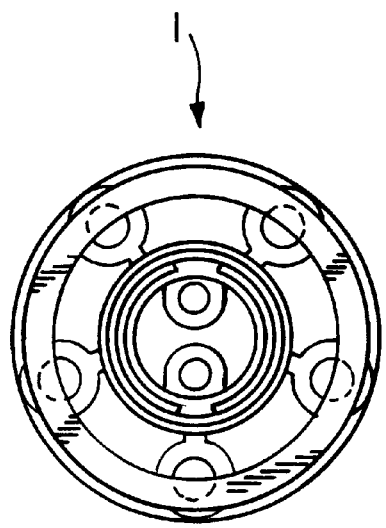
Figure 5:
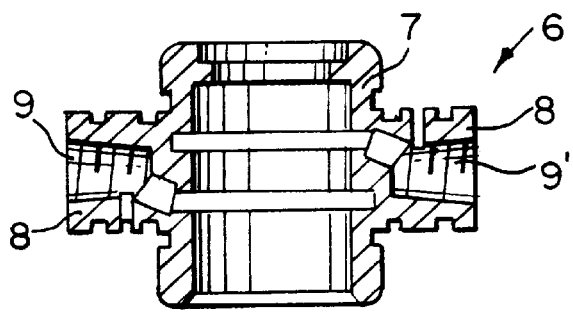
FIGS. 5, 6 and 7 are a section, a side view and an end view of a swivel element of the inventive multi-swivel connector of FIG. 1.
Figure 6:
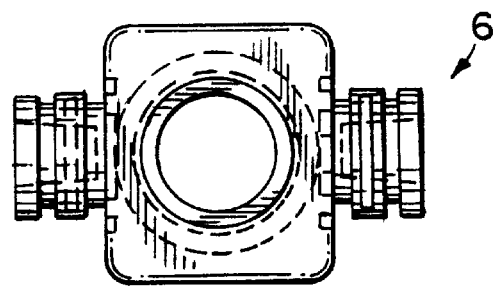
Figure 7:
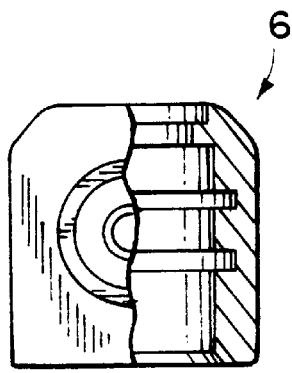
Figure 8:
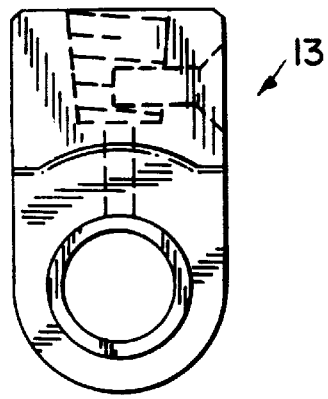
FIGS. 8, 9 and 10 are a side view, a top view and a section of a fitting element of the multi-swivel connector of FIG. 1.
Figure 9:
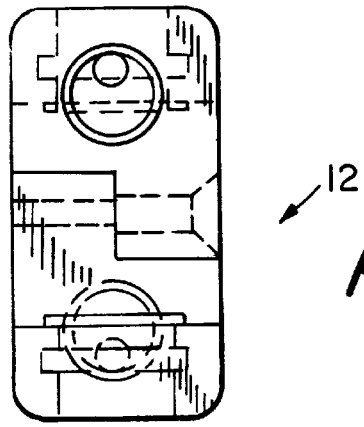
Figure 10:
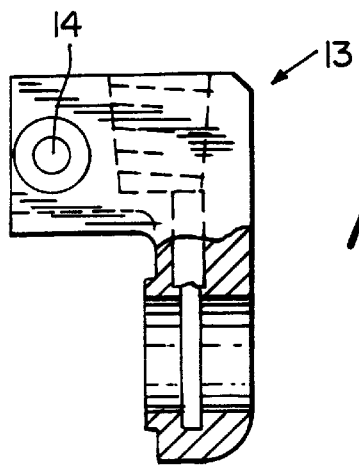

A multi-swivel connector for connecting a fluid-operated tool to a fluid source with the use of hoses each shown in a first embodiment of FIG. 1. The connector has a post which is identified as a whole with reference numeral 1. The post 1 is fixedly connectable to a fluid operated tool T, for example by balls extending through holes 2 of a flange. The main part of the post 1 extends vertically upwardly in FIG. 1 from the flange. The main part of the post 1 extends vertically upwardly in FIG. 1 from the flange. The post 1 has a vertical axis A1. A passage 3 extends from a lower end of the post 1 upwardly and has an upper portion extending perpendicularly to the axis to an outer peripheral surface of the post. An another passage 4 extends upwardly from the same end of the post 1 and also has a portion extending perpendicularly away from the axis A' towards the periphery of the post at a different height. The post 1 has a plurality of circular grooves 5 in which sealing elements are accommodated.

The connector further has swivel means identified as a whole with reference numeral 6. The swivel means 6 has a central collar 7 which is mounted on the body of the post 1 turnably about the axis A1, and two extensions 8 extending in two opposite directions from the axis A1 along an axis A2 of the swivel element. The swivel element has a chamber 9 which, at one side of the axis A1 communicates through an inclined passage with an annular groove 10 which, in turn, communicates through the transverse passage with the passage 4 of the post 1. It also has a chamber 9' which at the opposite side of the axis A1 communicates through an inclined intermediate passage with the annular groove 11 which in turn communicates with the transverse portion of the passage 3 of the post 1.

The connector further has fitting means which is identified as a whole with reference numeral 12. The fitting means have two fitting elements 13 which are connected with one another by a screw extending through an opening 14. Each fitting element 13 has an inlet hole 15, 16 which is formed as a threaded hole for screwing an end of a hose extending from a fluid source. The hole 15, 16 communicates with the chamber 9 of the swivel element 6 through a passage 17, 18. The fitting means 12 are arranged on the swivel means 6 turnably about an axis A2 over an angle which is at least one 180° and sealed relative to the 6 by sealing elements located in grooves 19.

The multi-swivel connector shown in FIGS. 1–10 operates in the following manner:

When it is necessary to operate a fluid-operated tool having for example a fluid-operated cylinder-piston unit which drives a tool element with the piston reciprocatingly movable in the cylinder, a fluid is supplied from a not shown fluid source through a not shown hose into the cylinder at one side of the piston for performing a forward stroke through the passages 15, 17, 9, 4, into the cylinder at one side of the piston. For a reverse stroke the fluid can be drained from one side of the piston and admitted to the opposite side of the piston and supplied into the cylinder at the opposite side of the piston through the passages 16, 18, 9', 3.

During the operation the multi-swivel connector allows the fluid-operated tool to move with a substantial degree of freedom since the swivel means 6 is turnable around the axis A1 of the post many times over an angle which is more than 360°, while the fitting means 12 is turnable relative to the swivel means around the axis A2 over at least one 180°.

Figure 11:
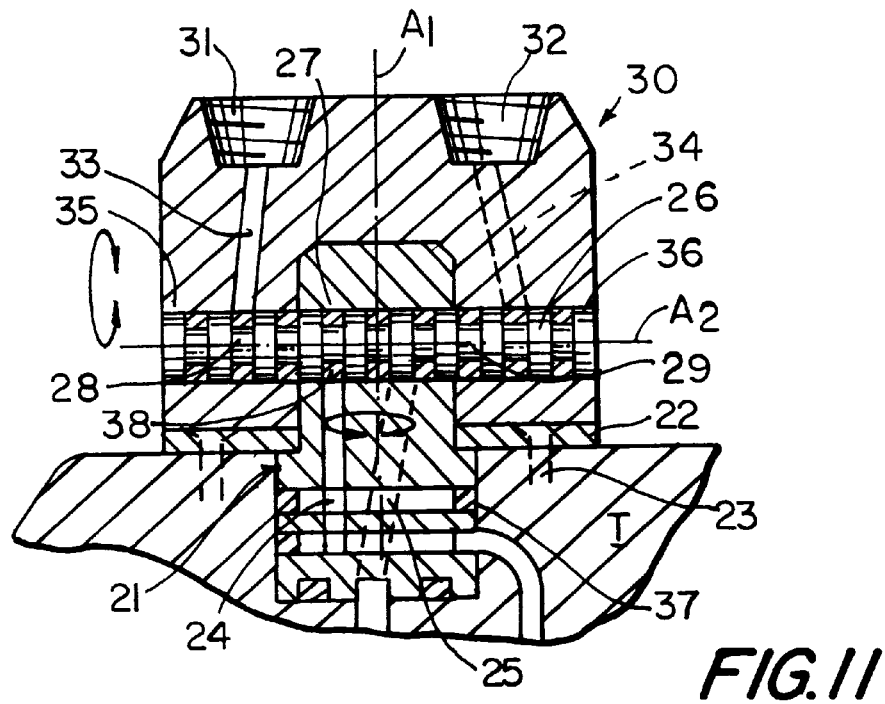
FIG. 11 is a view showing a section of a multi-swivel connector in accordance with another embodiment of the present invention.

FIG. 11 shows a further embodiment of the multi-swivel connector in accordance with the present invention. In this embodiment the post 21 is connected with the tool T so that it is turnable about an axis A1 of the post and retained on the tool by a washer 22 which is fixed to the tool by screws 23. A first passage 24 extends from an annular groove which is formed in the post 21 and communicates with a passage provided in the tool, while a second passage 25 formed in the post 21 communicates with a central passage of the tool.

The connector further has swivel which is identified as a whole with reference numeral 26. The swivel means 26 is formed as a shaft provided with a plurality of discs on it with spaces between the discs. The swivel means 26 is formed as an element which is separate from the post 21 and extends through a central opening 26 of the post. The swivel element 26 has a passage 28 communicating with the passage 24 of the post 21 and a passage 29 communicating with the passage 25 of the post 21. The passages 28 and 29 extend in direction of the axis A2 of the swivel element 26.

The tool further has fitting means identified as a whole with reference numeral 30. The fitting means have two openings 31 and 32 which can be formed as threaded openings for screwing of the ends of not shown hoses extending from the fluid source. The fitting means 30 is formed as an integral element which is provided with a passage 33 which communicates the holes 31 with the passage 28 of the swivel element 26, and a passage 34 which communicates with the passage 29 of the swivel element. The fitting means 30 further has two aligned transverse openings 35 and 36 which are in alignment with the central opening 27 of the post 21. The swivel element 26 is insertable into the aligned openings 27, 35, 36 and removable from them. Sealing elements 37 seal the post 21 relative to the tool and sealing elements 38 seal the swivel element 26 relative to the fitting element 30.

The multi-swivel connector in accordance with the present invention operates in the same manner as the multi-swivel connector as FIG. 1 with the only difference in that the multi-swivel connector of FIG. 11 the post is turnable about its axis relative to the tool and the swivel element 26 is axially insertable and withdrawable through the aligned openings of the post 21 and the fitting element 30. The fitting element 30 in this embodiment is also turnable over an angle more than 360° above the axis A1, and turnable over the axis at least 180° about the axis A2.

Figure 12:
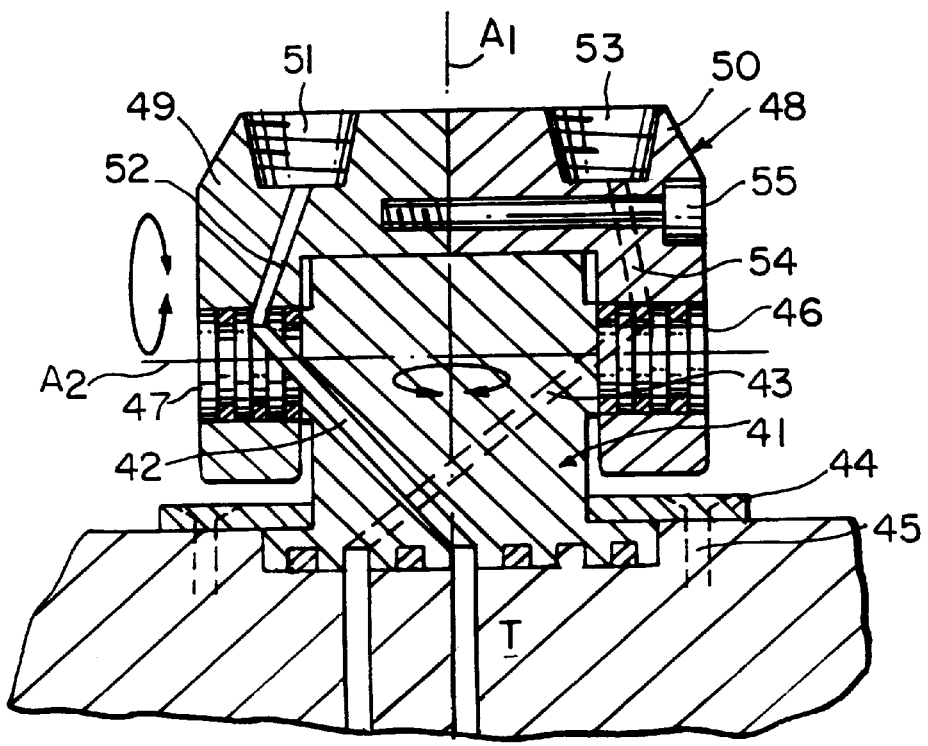
FIG. 12 is a view showing a multi-swivel connector in accordance with still a further embodiment of the present invention.

In the embodiment of FIG. 12 the multi-swivel connector has a post which is identified with reference numeral 41 and has two passages 42 and 43 communicating with corresponding passages in the tool T. The post 41 is arranged also turnably relative to the tool about the axis A1 and retained on the tool by a washer 44 which is screwed to the surface of the tool by screws 45. The swivel means in this embodiment is formed of one piece with the post 41 as two extensions 46 and 47 extending in two opposite direction along an axis A2. The passages 42 and 43 extend through the corresponding extensions as well.

The connector further has fitting means 48 which is composed of two fitting elements 49 and 50. The fitting element 49 has a threaded hole 51 for screwing of an end of a not shown hose extending from the fluid source and communicating with a passage 52 which in turn communicates with the passage 42 of the post 41. The fitting member 48 has a threaded hole 53 for screwing an end of a not shown hose extending from the fluid source and communicating with a passage 54 which in turn communicates with the passage 43 of the post 41. The fitting elements 49 and 50 are connected with one another by a screw 55.

The multi-swivel connector of FIG. 12 operates in the same manner as the multi-swivel connectors of FIGS. 1 and 11 for supplying the fluid to the fluid operated tool and withdrawing the fluid from it. The difference of the multi-swivel connector of FIG. 12 is that here the swivel means 46 is formed of one piece with the post 41 which is turnable about the axis A1 or the angle of more 360°, while the fitting element 48 is composed of two parts connected with one another and is turnable about the axis A2 over at least 180°.

It will be understood that each of the elements described above, or two or more together, may also find a useful application in other types of constructions differing from the types described above.

While the invention has been illustrated and described as embodied in multi-swivel connector for connecting a fluid operated tool to a source of fluid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A multi-swivel connector for connecting a fluid-operated tool to a fluid source, comprising a post having an axis; swivel means having an axis extending perpendicular to said axis of said post; at least one fluid line entering said post at one end of said post and exiting on said swivel means toward another end of said post; fitting means on said swivel means and having at least one inlet and at least one second fluid line which extends from said at least one fluid line outwardly to be connected through said inlet with a hose or the like extending from the fluid source, so that when the fluid enters said fitting means it is fed to said one end of said post to operate the fluid-operated tool, and said fitting means being turnable around said axis of said post over at least 360° and tiltable around said axis of said swivel means over substantially 180°.

2. A multi-swivel connector as defined in claim 1, wherein said post is connectable at said one end with the fluid operated tool immovably; and further comprising means for removably connecting said post with said one end with said fluid operated tool.

3. A multi-swivel connector as defined in claim 2, wherein said swivel means is arranged turnably around said axis of said swivel means relative to said post.

4. A multi-swivel connector as defined in claim 3, wherein said at least one fluid line extends through said post and through said turnable swivel means.

5. A multi-swivel connector as defined in claim 1, wherein said post is arranged turnably relative to the fluid-operated tool about said axis of said post; and further comprising means for connecting said post to the fluid operated tool turnably about said axis of said post.

6. A multi-swivel connector as defined in claim 5, wherein said swivel means is formed of one piece with said post so as to form an integral element turnably about an axis of said post and having a first post part and a second swivel part.

7. A multi-swivel connector as defined in claim 6, wherein said at least one fluid line extends through said post part and through said swivel part of said integral element.

8. A multi-swivel connector as defined in claim 1, wherein said swivel means is formed as a separate member arranged on said post turnably about said axis of said swivel means, said fitting means being composed of two fitting parts which are mounted on said swivel means and connected with one another; and further comprising means for connecting said fitting elements with one another.

9. A multi-swivel connector as defined in claim 1, wherein said swivel means is formed of one piece with said post so as to form an integral element, said fitting means including two fitting members which are mounted on said swivel means and connected with one another; and further comprising means for connecting said fitting elements with one another.

10. A multi-swivel connector as defined in claim 1, wherein said post has a throughgoing opening extending along said axis of said swivel means, said fitting means also having a throughgoing opening coinciding with a throughgoing opening of said post, said swivel means being formed as a member which is insert into and held in said throughgoing openings of said post and said fitting means.

11. A multi-swivel connector for connecting a fluid-operated tool to a fluid source, comprising a post having an axis; swivel means having an axis extending perpendicular to said axis of said post; at least one fluid line entering said post at one end of said post and exiting on said swivel means toward another end of said post; fitting means on said swivel means and having at least one inlet having an inlet axis and at least one second fluid line which extends from said at least one fluid line outwardly to be connected through said inlet with a hose or the like extending from the fluid source, so that when the fluid enters said fitting means it is fed to said one end of said post to operate the fluid-operated tool, and said fitting means being turnable around aid axis of said post over at least 360° and tiltable around said axis of said swivel means over substantially 180°, so that said inlet axis can extend perpendicular to said axis of said post, parallel to said axis of said post or at any angle between a perpendicular position and a parallel position.

* * * * *